United States Patent
Fukuda et al.

(10) Patent No.: US 7,685,260 B2
(45) Date of Patent: Mar. 23, 2010

(54) METHOD FOR ANALYZING STATE TRANSITION IN WEB PAGE

(75) Inventors: Kentarou Fukuda, Sagamihara (JP); Shin Saito, Yamato (JP)

(73) Assignee: International Business Machines Corporation, Armonk, NY (US)

(*) Notice: Subject to any disclaimer, the term of this patent is extended or adjusted under 35 U.S.C. 154(b) by 526 days.

(21) Appl. No.: 11/608,566

(22) Filed: Dec. 8, 2006

(65) Prior Publication Data
US 2007/0150556 A1 Jun. 28, 2007

(30) Foreign Application Priority Data
Dec. 22, 2005 (JP) ............... 2005-370560

(51) Int. Cl.
*G06F 15/16* (2006.01)
*G06F 17/00* (2006.01)
(52) U.S. Cl. .................... 709/219; 715/200
(58) Field of Classification Search ......... 709/203–233; 711/100; 715/513–760; 725/114
See application file for complete search history.

(56) References Cited

U.S. PATENT DOCUMENTS

| | | | |
|---|---|---|---|
| 2003/0074425 A1* | 4/2003 | Kawakita | 709/219 |
| 2003/0126352 A1* | 7/2003 | Barrett | 711/100 |
| 2004/0205582 A1* | 10/2004 | Schiller et al. | 715/513 |
| 2005/0097308 A1* | 5/2005 | Holzmann | 713/1 |
| 2005/0138426 A1* | 6/2005 | Styslinger | 713/201 |
| 2006/0150111 A1* | 7/2006 | Farber | 715/760 |
| 2006/0224973 A1* | 10/2006 | Albrecht et al. | 715/760 |
| 2007/0050710 A1* | 3/2007 | Redekop | 715/523 |
| 2008/0059571 A1* | 3/2008 | Khoo | 709/203 |
| 2008/0155633 A1* | 6/2008 | Watson | 725/114 |

FOREIGN PATENT DOCUMENTS

| JP | 2000076266 | 3/2000 |
|---|---|---|
| JP | 2004280231 | 10/2004 |

* cited by examiner

*Primary Examiner*—Joseph E Avellino
*Assistant Examiner*—Banglong Tran
(74) *Attorney, Agent, or Firm*—Yee & Associates, P.C.

(57) ABSTRACT

A method that enables a tester to efficiently perform confirmation behavior of a Web page that utilizes DHTML or difference in behavior of the Web page among various browsers, or assignment of information relating to accessibility of the Web page or verification of the information. A method is provided that analyzes change in a Web page by determining states that can dynamically occur in response to an external event in a Web page that utilizes DHTML by analyzing at least one of DOM, style information for when rendered on a browser, input data from a user, and the value of a global variable in JAVA®SCRIPT, storing data that can identify each of the states, identifying state transition between the stored states, and reproducing the stored states.

4 Claims, 16 Drawing Sheets

[Figure 1]
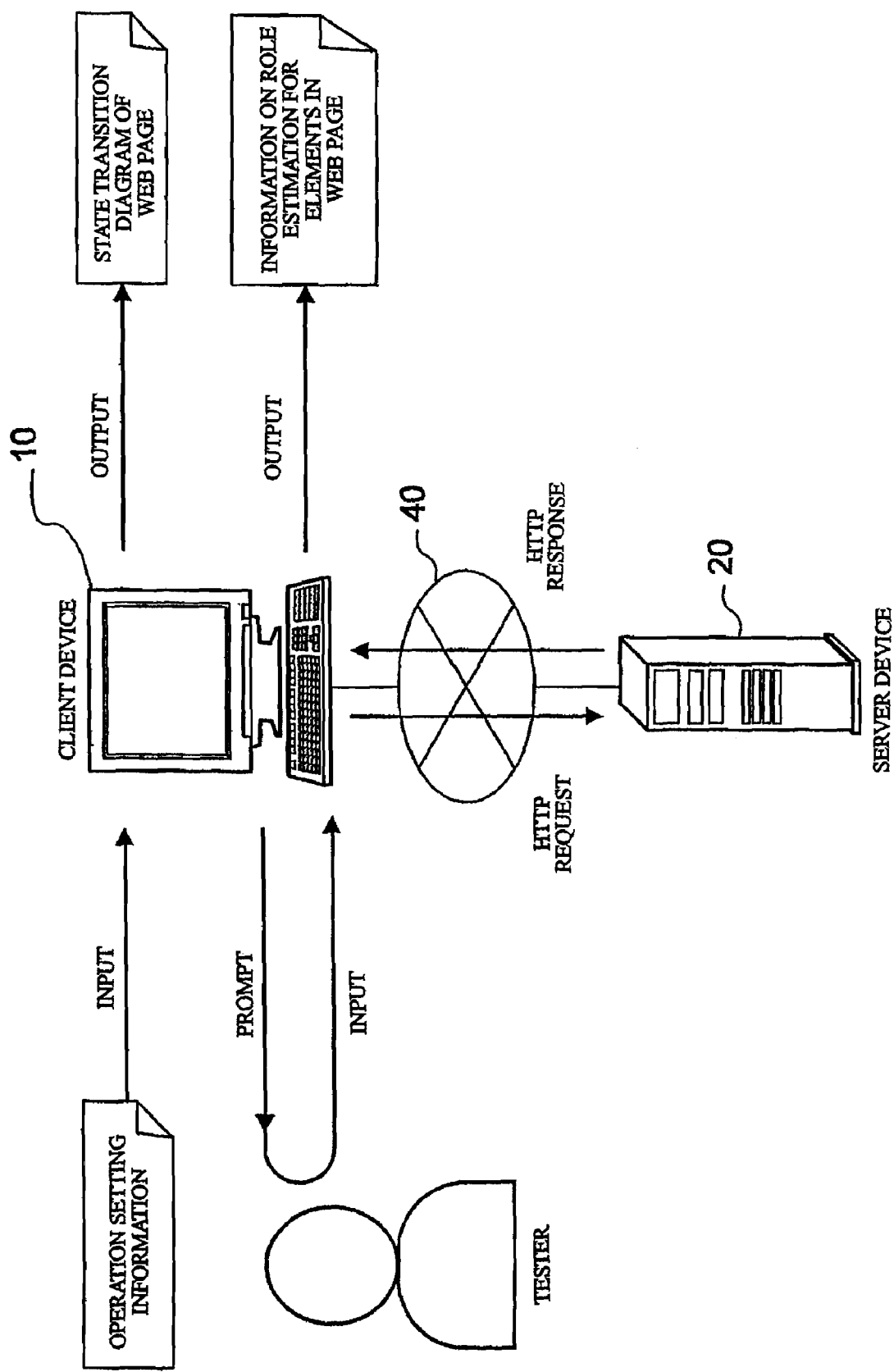

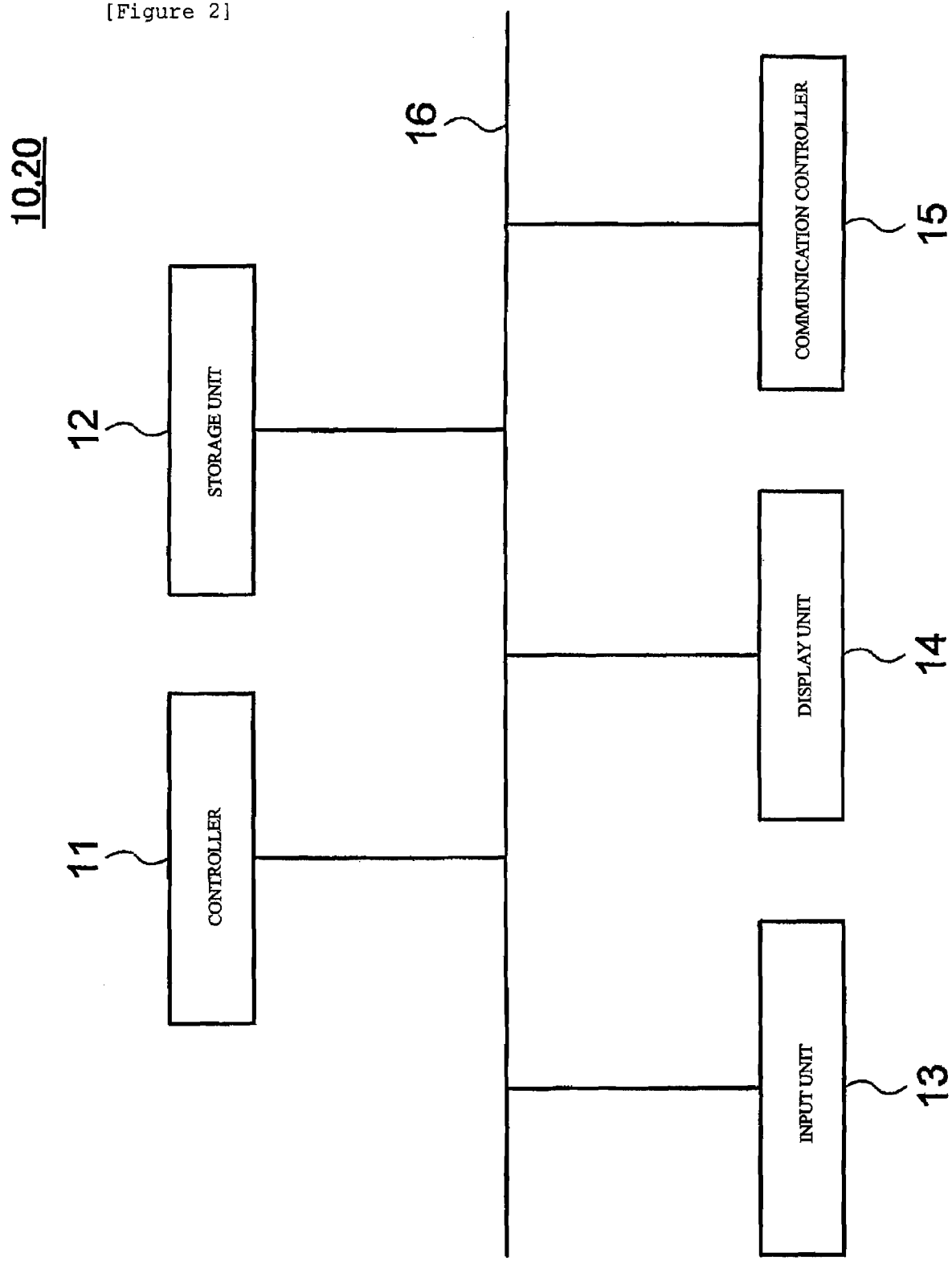
[Figure 2]

[Figure 3]
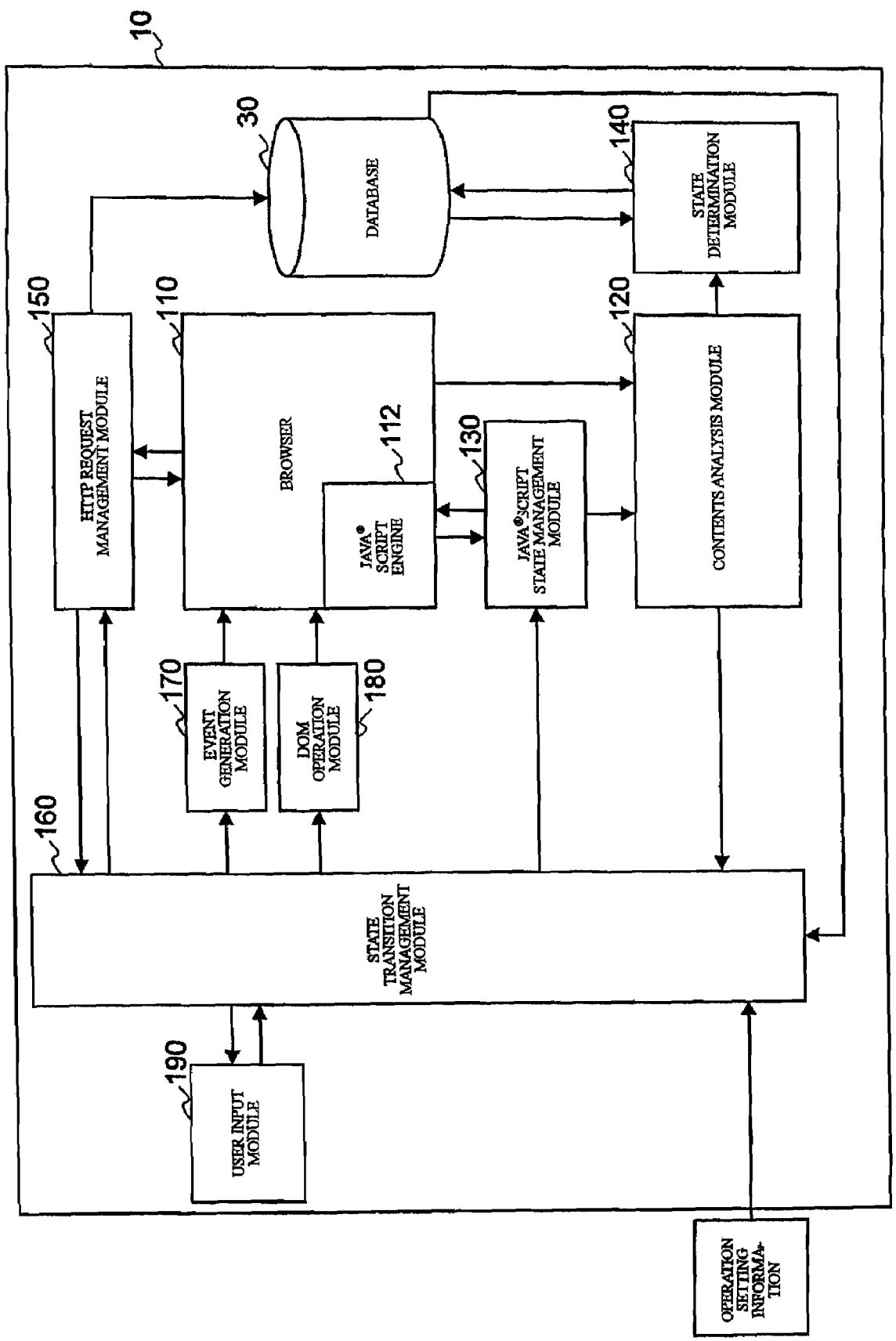

[Figure 4]
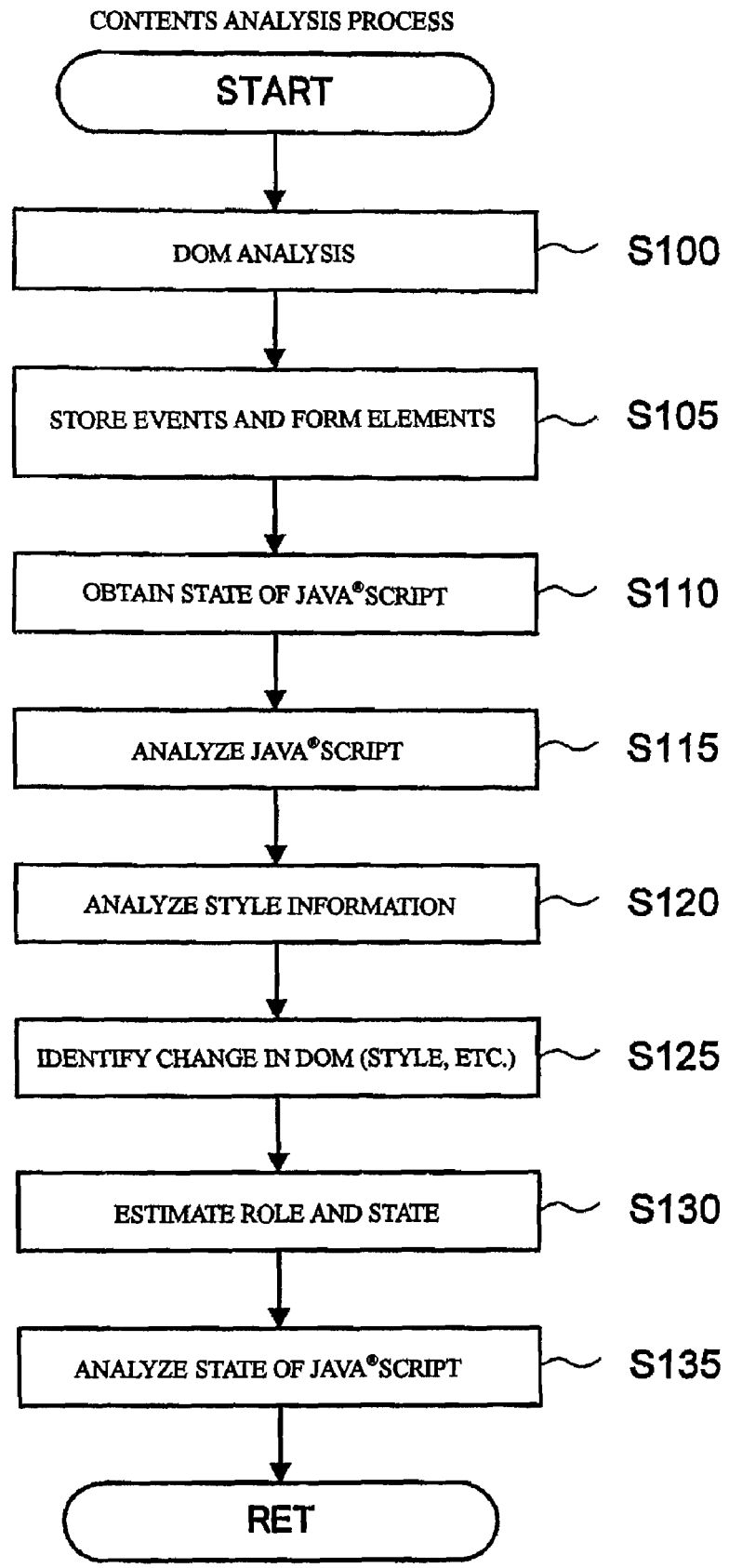

[Figure 5]
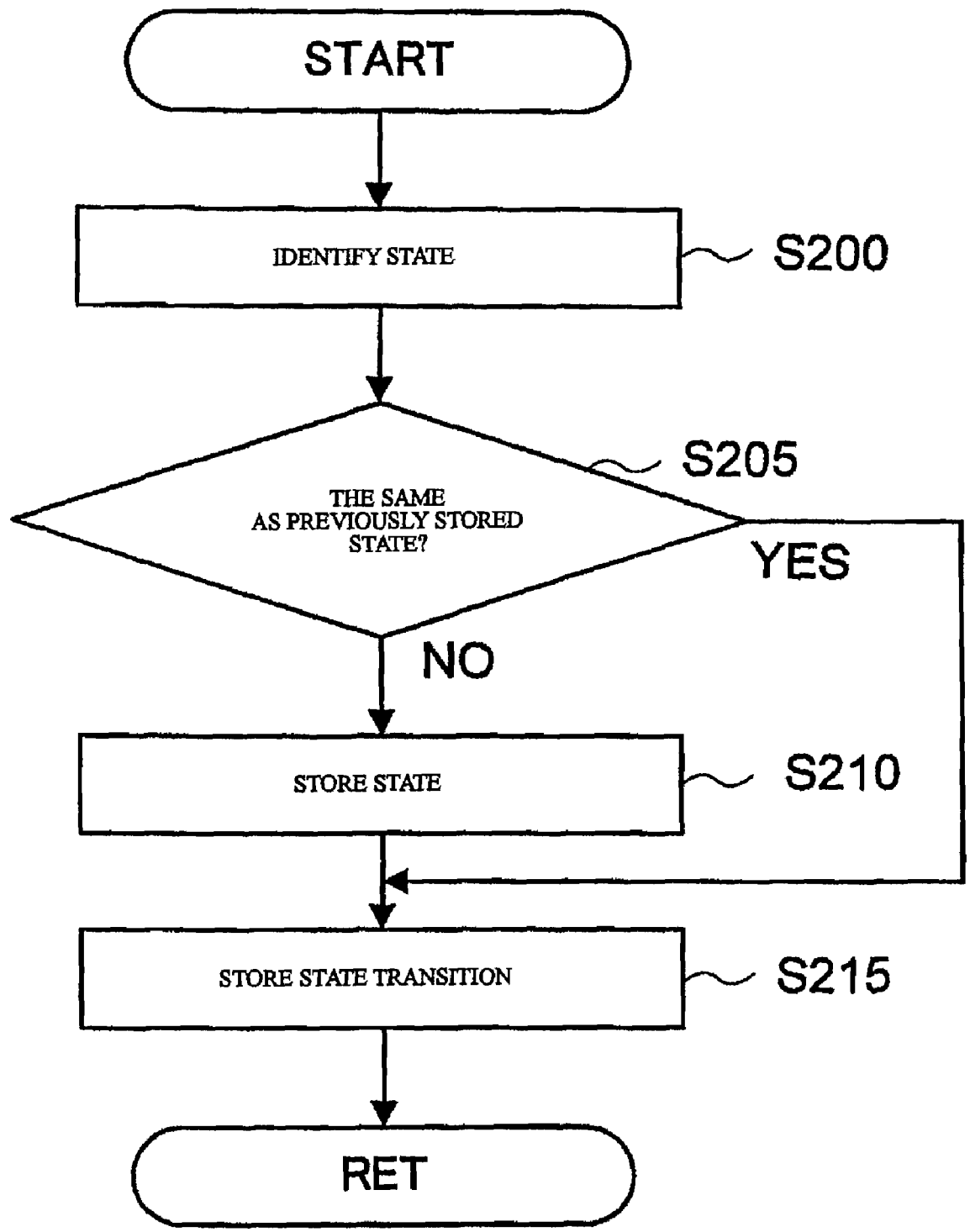

[Figure 6]

STATE TABLE  50

| STATE ID | PAGE | CATEGORY | ITEM | DESCRIPTION |
|---|---|---|---|---|
| 0012 | index | DOM | TREE | |
| | | STYLE | FONT | Large |
| | | | BACKGROUND COLOR | White |
| | | | ⋮ | ⋮ |
| | | STATE OF JAVA®SCRIPT | GLOBAL VARIABLE a | 10 |
| | | | ⋮ | ⋮ |
| | | INPUT UNIT | MOUSE COORDINATES | 200, 100 |
| | | | KEYBOARD | Ctrl PRESSED |
| | | | ⋮ | ⋮ |
| | | SERVER VARIABLE | VARIABLE A | 20 |
| | | | ⋮ | ⋮ |
| | | ELEMENT | 001 | EXPANDED |
| | | | ⋮ | ⋮ |
| ⋮ | ⋮ | ⋮ | ⋮ | ⋮ |

[Figure 7]

STATE TRANSITION TABLE 60

| ELEMENT ID | EVENT ID | ID PRIOR TO OCCURRENCE | ID AFTER OCCURRENCE | PHENOMENON THAT OCCURS |
|---|---|---|---|---|
| 001 | 001 | 0011 | 0012 | POP-UP OF A PULL-DOWN MENU |
| ... | ... | ... | ... | ... |

[Figure 8]

| ELEMENT ID | ELEMENT ROLE ESTIMATION TABLE 70 | |
|---|---|---|
| | ROLE | |
| 001 | MENU | ... |
| ... | ... | |

[Figure 9]
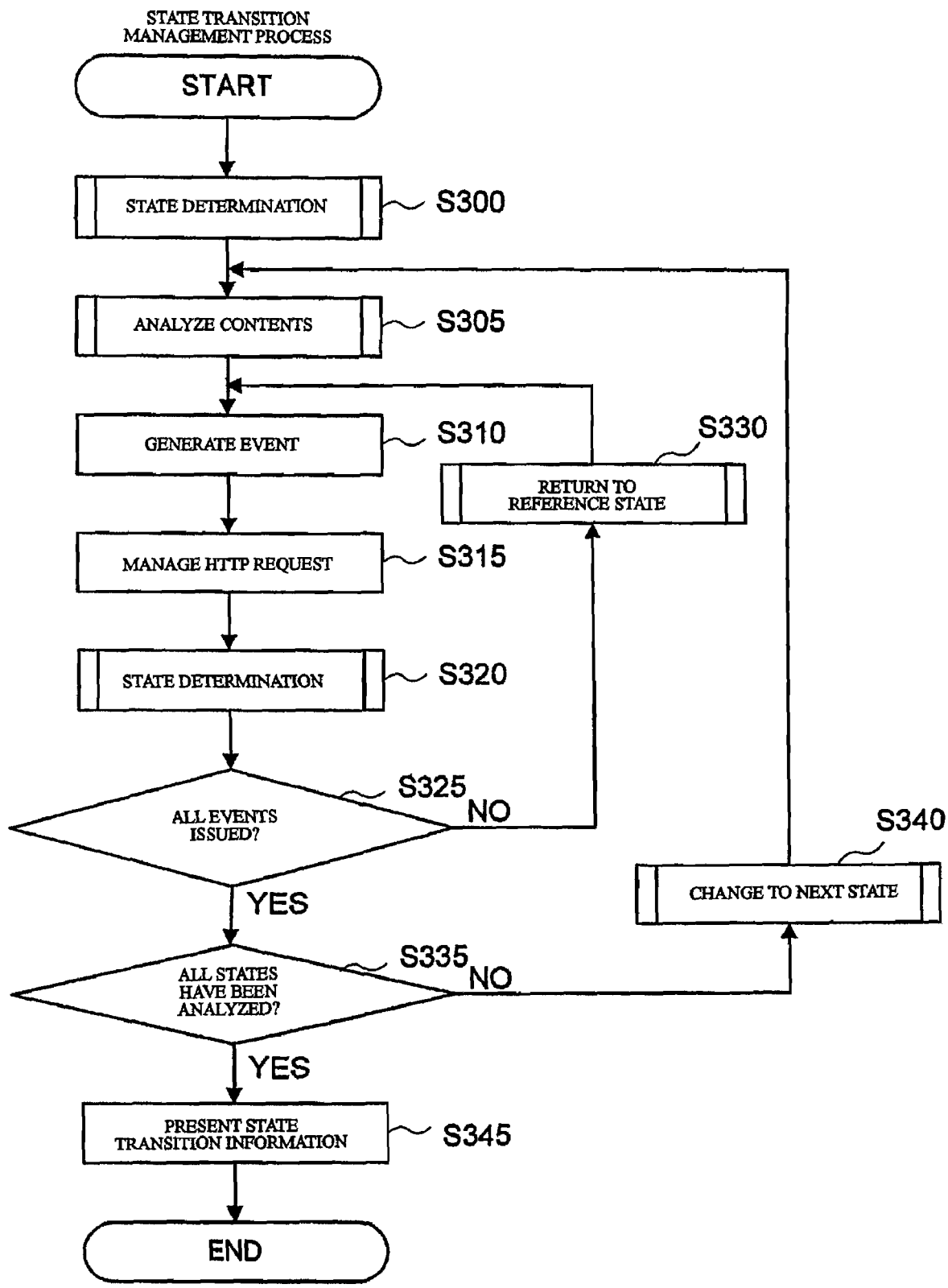

[Figure 10]
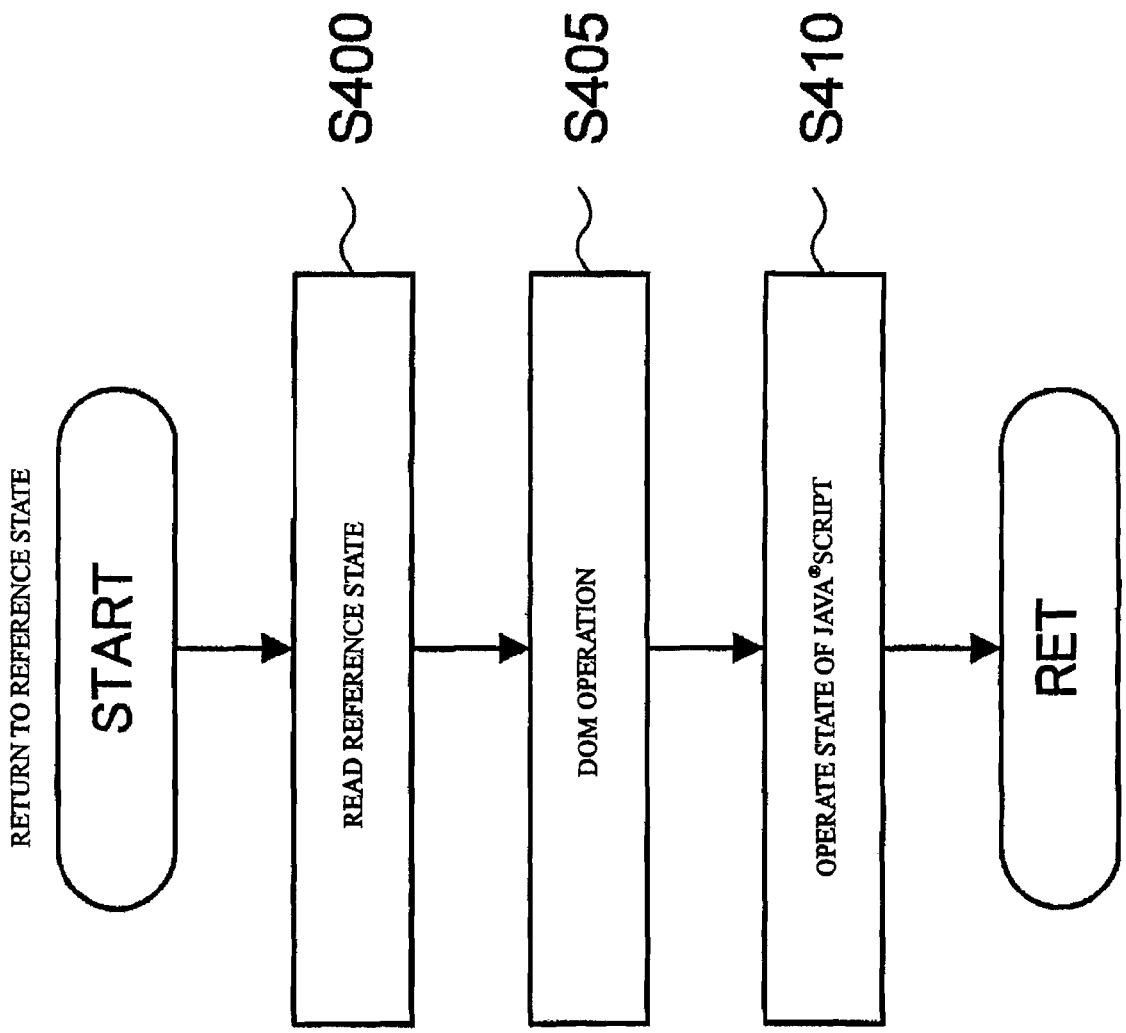

[Figure 11]
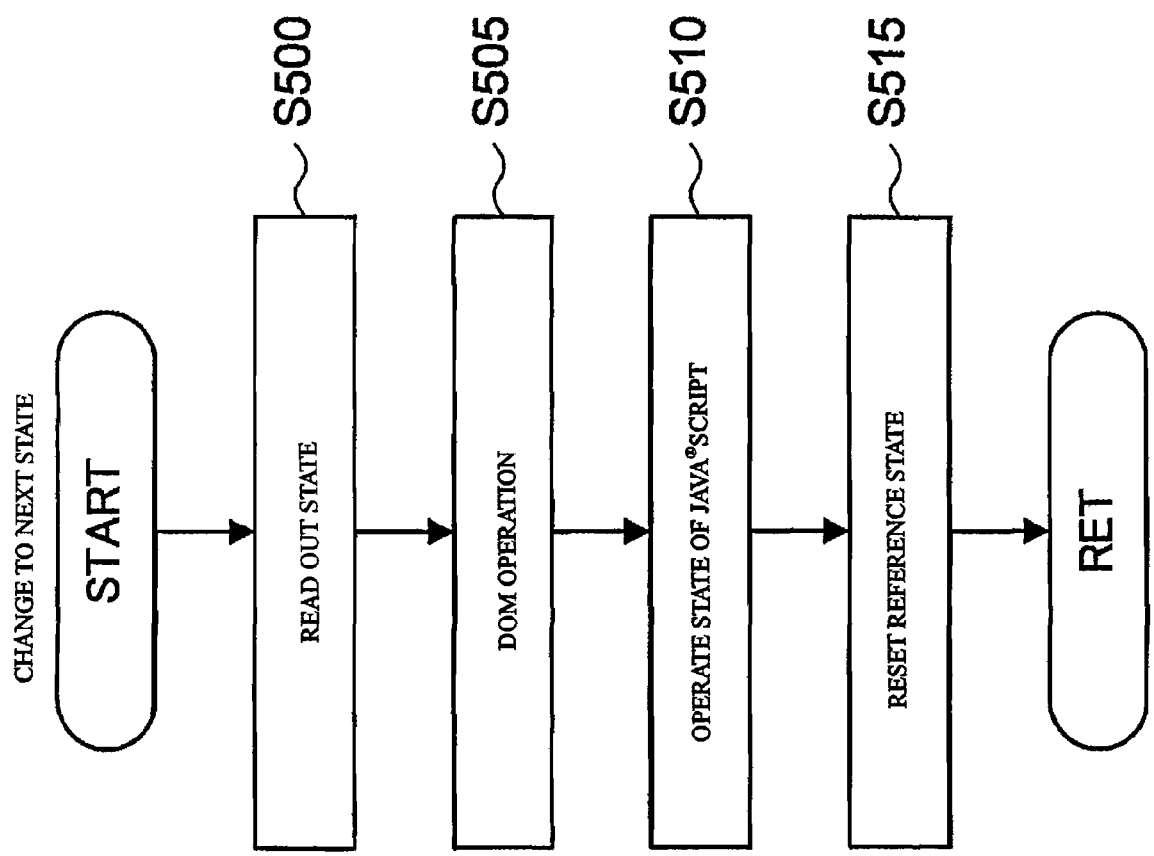

[Figure 12]
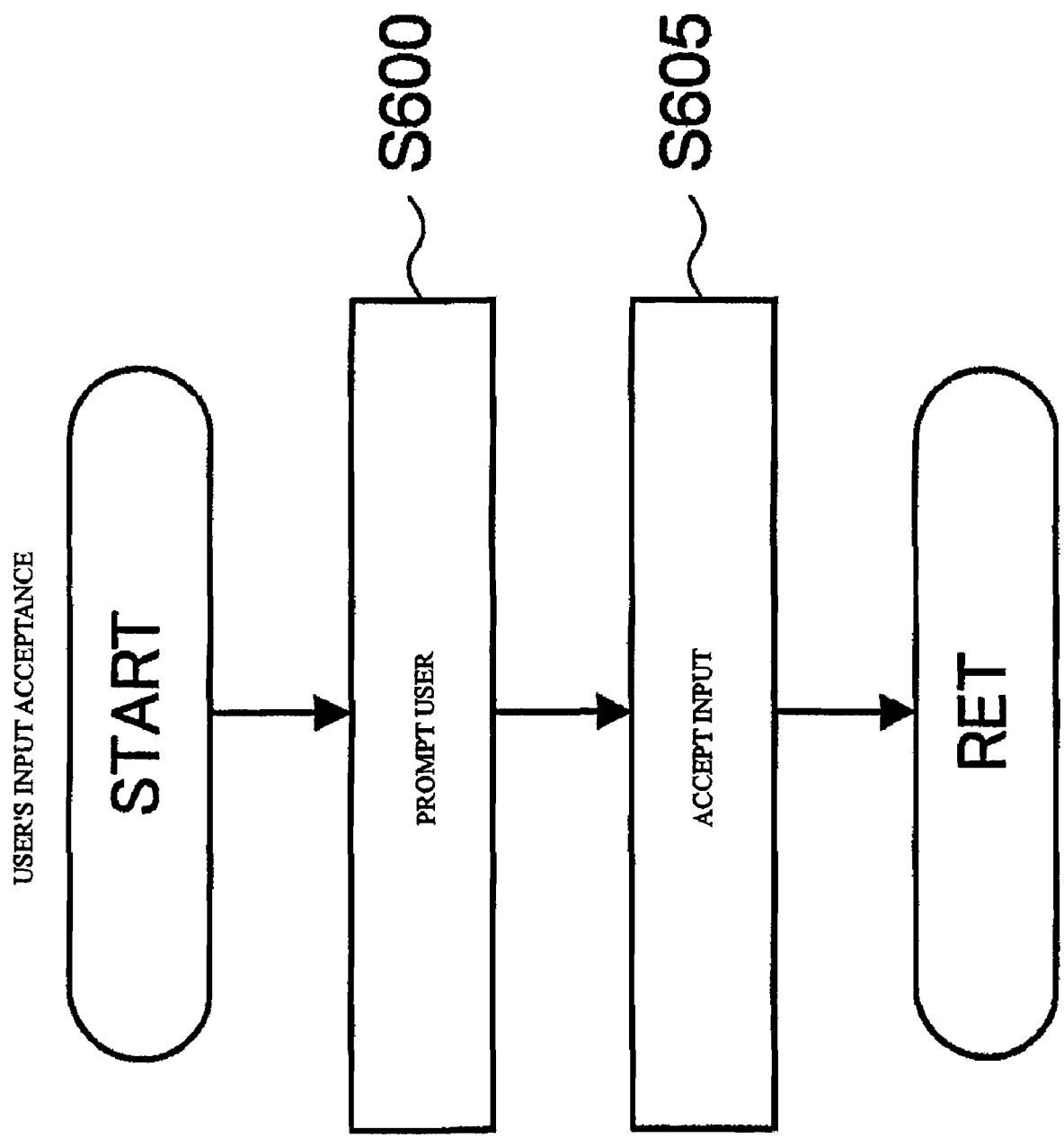

[Figure 13]
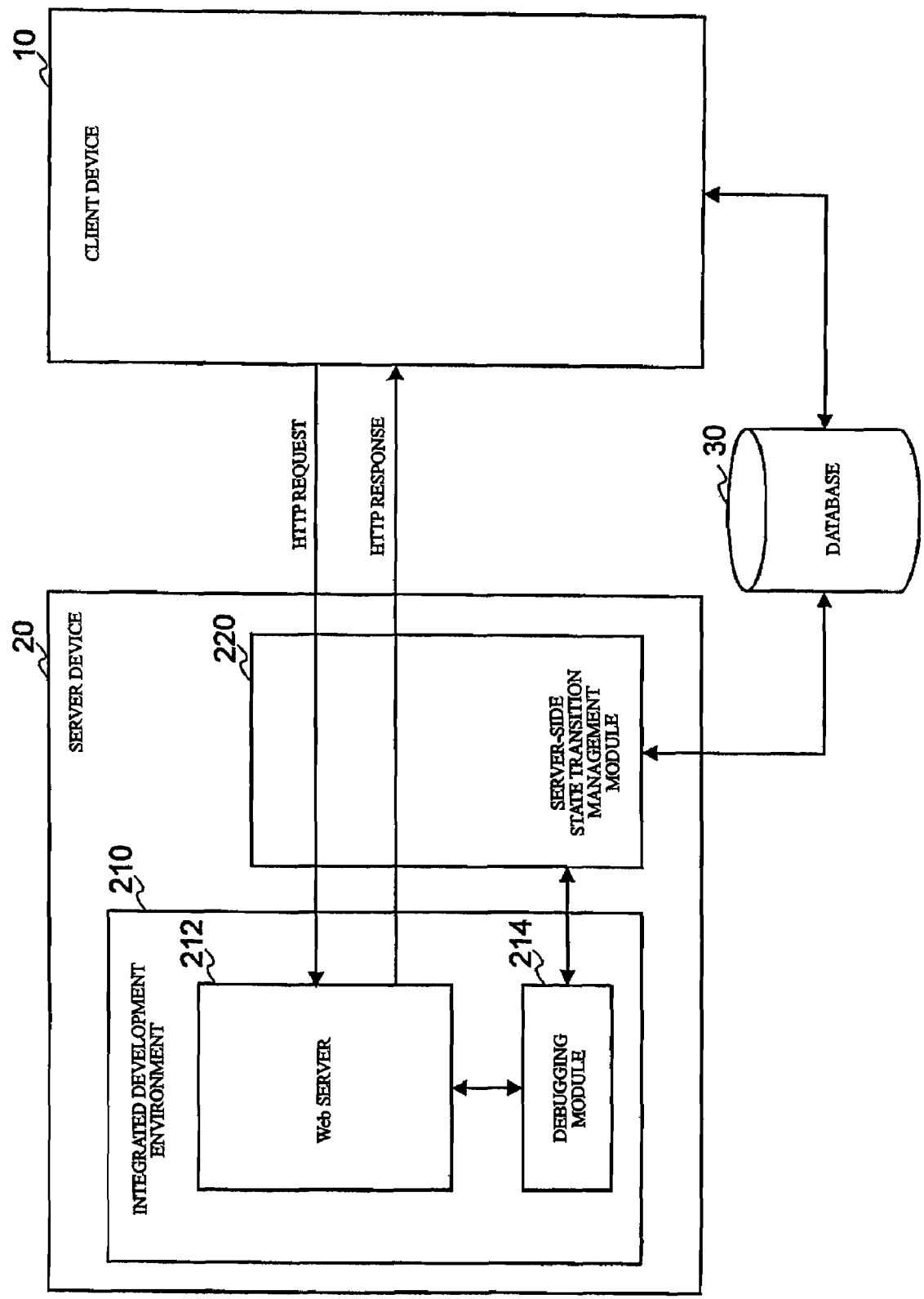

[Figure 14]
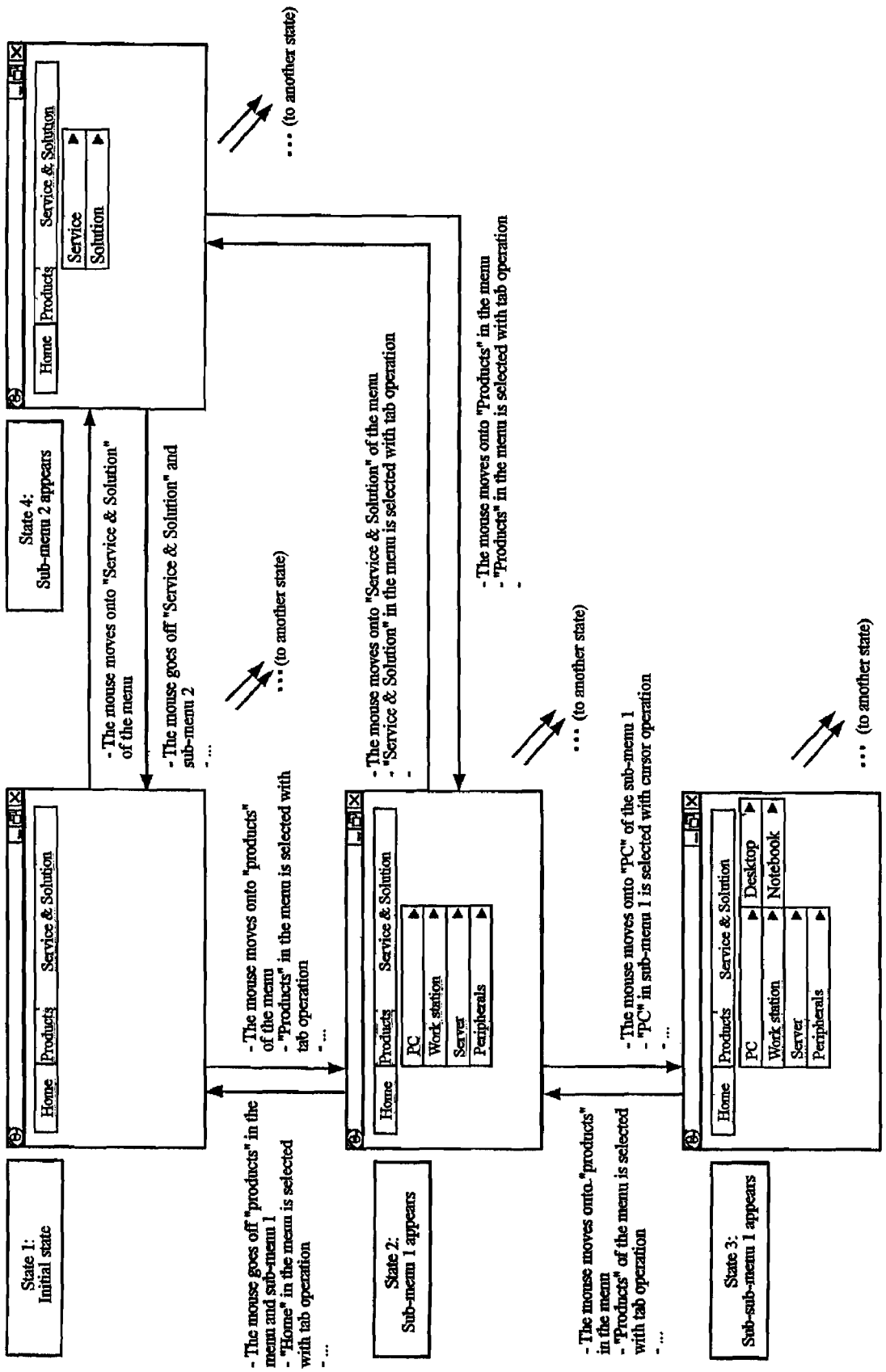

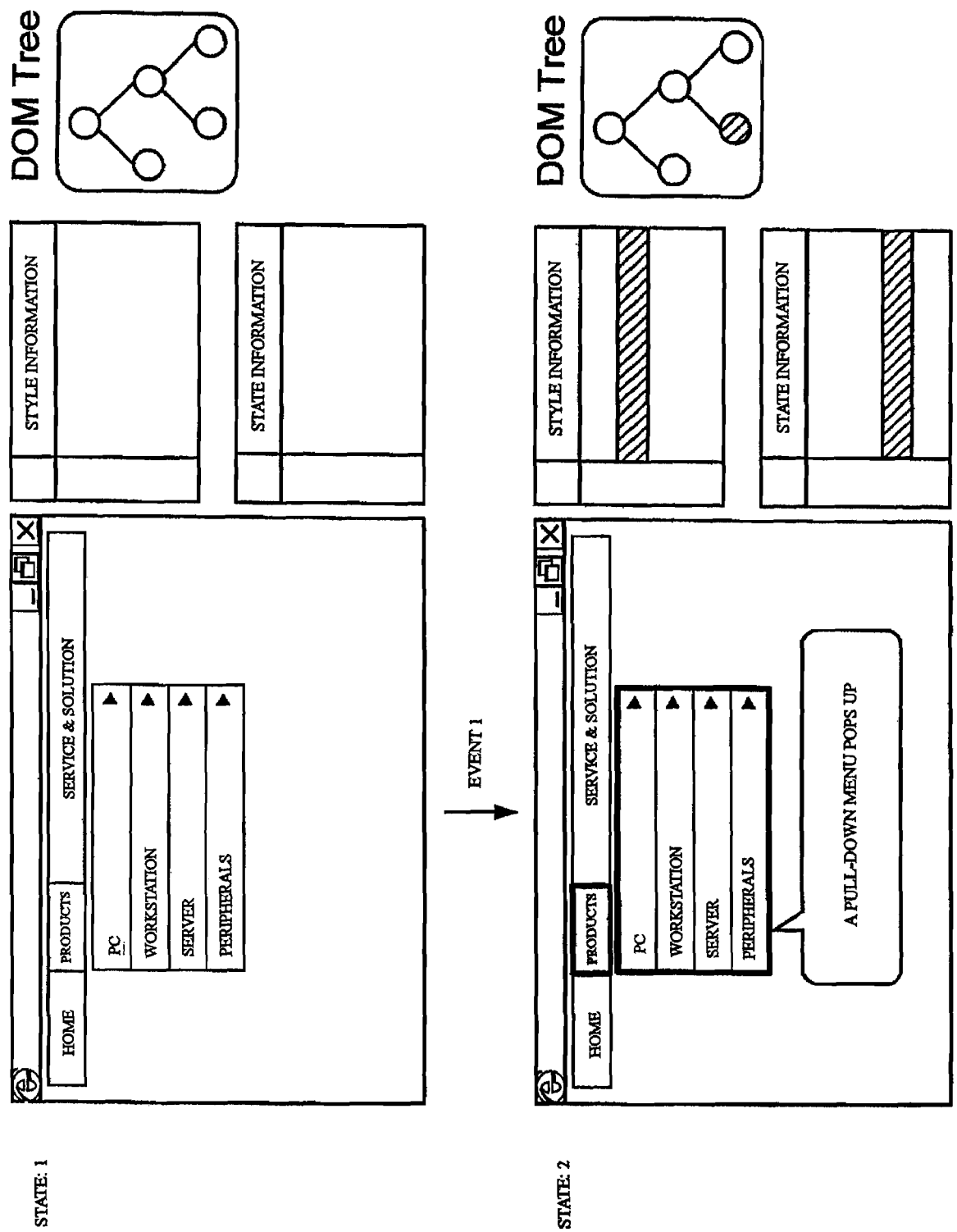
[Figure 15]

[Figure 16]

```
<DIV class=sub id=hoge style="VISIBILITY: hidden">
    <DIV class=hoge2>...</DIV>
    <DIV class=block id=Register style="TOP: 0px">...</DIV>
    <DIV class=txt id=RegisterTxt style="TOP: 0px">...
        <A href="...">Register Me</A>...</DIV>
    <DIV class=arrow>...</DIV>
    <DIV class=block id=ViewMyDetail style="TOP: 19px">...</DIV>
    <DIV class=txt id=ViewMyDetailTxt style="TOP: 19px">...
        <A href="...">View My Details</A>...</DIV>
</DIV>
```

```
<DIV class=sub id=hoge style="VISIBILITY: visible ">
    <DIV class=hoge2>...</DIV>
    <DIV class=block id=Register style="TOP: 0px">...</DIV>
    <DIV class=txt id=RegisterTxt style="TOP: 0px">...
        <A href="...">Register Me</A>...</DIV>
    <DIV class=arrow>...</DIV>
    <DIV class=block id=ViewMyDetail style="TOP: 19px">...</DIV>
    <DIV class=txt id=ViewMyDetailTxt style="TOP: 19px">...
        <A href="...">View My Details</A>...</DIV>
</DIV>
```

METHOD FOR ANALYZING STATE TRANSITION IN WEB PAGE

BACKGROUND OF THE INVENTION

1. Field of the Invention

The present invention relates to a method for analyzing state transition in a Web page. More particularly, the present invention relates to a method, apparatus, system, and program for dynamically analyzing state transition in a Web page that utilizes DHTML.

2. Description of the Related Art

In recent years, Dynamic HTML (DHTML, a registered trademark) has been widely employed that can provide interactivity in Web pages by means of JAVA®SCRIPT (a registered trademark). By using DHTML, it is possible to provide a pull-down menu in a Web page or to verify items input to a form in a Web page. This enables a Web page to have functions equivalent to typical applications.

Although "HTML" and "JAVA®SCRIPT" mentioned above are registered trademarks, indication of registered trademark will be omitted in the following description.

Under such a circumstance, techniques for checking behavior of a Web page have been provided.

For example, Patent Document 1 proposes a technique for enabling recording/reproduction of a user's operations on a Web browser or execution of a form with input values to it varied. With this technique, it is possible to efficiently collect results of input of various values to a particular form.

Patent Document 2 proposes a technique for checking a user interface based on an external specification form or screen transition information preliminarily prepared.

[Patent Document 1] Published Unexamined Japanese Patent Application No. 2000-76266

[Patent Document 2] Published Unexamined Japanese Patent Application No. 2004-280231

However, the technique of Patent Document 1 has problems that at least one input operation to a form needs to be performed or significant effort is required for checking collected results. In addition, when there are a plurality of interactive elements in a Web page or an interactive element is present in an element that newly appears in response to a certain operation, it is difficult to carry out all operations comprehensively and check all results.

The technique of Patent Document 2 has a problem in that it assumes that information like specifications is prepared and the information is manually input. It is also difficult to check operation series that deviates from prepared information (i.e., operation series that are not given beforehand).

Thus, in a Web page that uses DHTML, its functions and behavior in response to a user's action are difficult to check or test.

Since behavior of DHTML varies with browser implementation, it is often the case that the type of a browser is identified and operation of DHTML is switched. There is no known technique for checking difference in behavior among various platforms.

It is also known that accessibility is difficult to confirm in a Web page that uses DHTML. For example, while it is possible to confirm whether one can operate a portion for which certain processing is caused by JAVA®SCRIPT without resorting to a device such as a mouse, accessibility of the Web page that results from the operation is difficult to check.

To improve accessibility of a Web page that uses DHTML and allow it to operate in conjunction with Assistive Technology (AT) software such as a screen reader, it is required that information such as role and state is set for each element that uses DHTML.

However, there has been no technique for efficiently carrying out information assignment to existing contents that have no such information given and/or a technique for verifying such information provided by a Web page creator.

In view of such situations, one object of the invention is to provide a method that can allow a tester to efficiently check behavior of a Web page that utilizes DHTML or difference in behavior of a Web page among various browsers, or assign information relating to accessibility in the Web page or verify the appropriateness.

BRIEF SUMMARY OF THE INVENTION

According to the first embodiment of the invention, there is provided a method for analyzing change in a Web page that utilizes DHTML. The method comprises determining an event that dynamically causes transition in state in the Web page (e.g., a user's input, timer interrupt, and input from another application); virtually executing the event in order to a state after the transition; obtaining the state in the Web page as data, determining whether the state is a state that has already appeared and storing the state; and reproducing the stored state in the Web page.

The method is characterized in that it obtains the state in the Web page as data that is composed at least one of Document Object Model (DOM) that handles the contents in the Web page (e.g., sentences, images, or audio) and their arrangement or style as objects, style information (e.g., font, background color) for a screen displayed on a browser, input data from a user and the like, and the value of a global variable (i.e., a variable defined for the entire program) in JAVA®SCRIPT.

According to the second embodiment of the invention, there is provided a client device that analyzes change in a Web page that utilizes DHTML. The client device comprises a state transition analysis unit for determining an event that dynamically causes transition in state in the Web page (the contents analysis module 120 of FIG. 3); an event execution unit for virtually executing the event in order to obtain state after the transition (the event generation module 170 of FIG. 3); a state storage unit for obtaining the state in the Web page as data, determining whether the state is a state that has already appeared, and storing the state (the state determination module 140 of FIG. 3); and a state reproducing unit for reproducing the stored state in the Web page (the state transition management module 160, JAVA®SCRIPT state management module 130, and DOM operation module 180 of FIG. 3).

According to the third embodiment of the invention, there is provided a data processing system comprising a client device and a server device for analyzing change in a Web page that utilizes DHTML. The data processing system comprises a state transition analysis unit for determining an event that dynamically causes transition in state in the Web page and a Web server that generates the Web page (the contents analysis module 120 of FIG. 3 and the debugging module 214 of FIG. 13); an event execution unit for virtually executing the event in order to obtain the state after the transition (the event generation module 170 of FIG. 3); a state storage unit for obtaining the state both in the Web page and the Web server as data, determining whether the state is a state that has already appeared, and storing the state (the state determination module 140 of FIG. 3 and the server side state transition management module 220 of FIG. 13); an HTTP request analysis unit for collecting and analyzing HTTP requests that can occur from the Web page (the HTTP request management module 150 of FIG. 3); a client state reproduction unit for reproducing a stored state in the Web page (the state transition management module 160, JAVA®SCRIPT state management module 130, and DOM operation module 180 of FIG. 3); and a server state reproducing unit for reproducing the stored state in the Web server (the server side state transition management module 220 and debugging module 214 of FIG. 13).

The data processing system is characterized in that it obtains the state both in the Web page and the Web server as data that is composed at least one of DOM, style information for when a screen is displayed on a browser, input data from a user, the value of a global variable in JAVA®SCRIPT, and the value of a variable on the Web server.

According to the fourth embodiment of the invention, there is provided a computer program for causing a computer to execute the method according to the first embodiment.

According to the embodiments, a computer can automatically and efficiently record and reproduce states that can occur in a Web page that utilizes DHTML.

According to the present invention, it may be possible to efficiently confirm accessibility of a Web page that utilizes DHTML and requirement definition, which have been conventionally difficult.

BRIEF DESCRIPTION OF THE SEVERAL VIEWS OF THE DRAWINGS

FIG. 1 is an overall conceptual diagram showing a preferred embodiment of the invention;

FIG. 2 is a block diagram showing the configuration of a computer according to a preferred embodiment of the invention;

FIG. 3 is a block diagram showing the implementation configuration of test means of a client device 10 according to a preferred embodiment of the invention;

FIG. 4 is a flow diagram showing the procedure of contents analysis process that is performed by the contents analysis module 120 of the test means according to a preferred embodiment of the invention;

FIG. 5 is a flow diagram showing the procedure of state determination process performed by the state determination module 140 of the test means according to a preferred embodiment of the invention;

FIG. 6 illustrates a state table 50 according to a preferred embodiment of the invention;

FIG. 7 illustrates a state transition table 60 according to a preferred embodiment of the invention;

FIG. 8 illustrates an element role estimation table 70 according to a preferred embodiment of the invention;

FIG. 9 is a flow diagram showing the procedure of state transition management process that is performed by the state transition management module 160 and its instruction signal of the test means according to a preferred embodiment of the invention;

FIG. 10 is a flow diagram showing the procedure of returning to the reference state during state transition management process of the test means according to a preferred embodiment of the invention;

FIG. 11 is a flow diagram showing the procedure of changing to the next state during state transition management process of the test means according to a preferred embodiment of the invention;

FIG. 12 is a flow diagram showing the procedure of a user's input acceptance process in state transition management process of the test means according to a preferred embodiment of the invention;

FIG. 13 is a block diagram showing the implementation configuration for a case where a test environment according to a preferred embodiment of the invention is expanded to a server device 20;

FIG. 14 illustrates exemplary presentation to a user with respect to presentation of state transition information in state transition management process of the test means according to a preferred embodiment of the invention;

FIG. 15 illustrates exemplary presentation to a user with respect to presentation of state transition information in state transition management process of the test means according to a preferred embodiment of the invention; and FIG. 16 illustrates exemplary presentation to a user with respect to presentation of state transition information in state transition management process of the test means according to a preferred embodiment of the invention.

REFERENCE NUMERALS

10 . . . client device
11 . . . controller
12 . . . storage unit
13 . . . input unit
14 . . . display unit
15 . . . communication controller
16 . . . bus
110 . . . browser
112 . . . JAVA®SCRIPT engine
120 . . . contents analysis module
130 . . . JAVA®SCRIPT state management module
140 . . . state transition determination module
150 . . . HTTP request management module
160 . . . state transition management module
170 . . . event generation module
180 . . . DOM operation module
190 . . . user input module
20 . . . server device
210 . . . integrated development environment
212 . . . Web server
214 . . . debugging module
220 . . . server side state transition management module
30 . . . database
40 . . . communication network
50 . . . state table
60 . . . state transition table
70 . . . element role estimation table

DETAILED DESCRIPTION OF THE INVENTION

An example of a preferred embodiment of the present invention will be described below with respect to drawings.

[Conceptual Diagram of an Embodiment]

FIG. 1 is an overall conceptual diagram showing an example of a preferred embodiment of the invention.

A client device 10 is connected to a server device 20 over a communication network 40. The client device 10 transmits an HTTP (Hypertext Transfer Protocol) request to the server device 20 and receives therefrom an HTTP response so as to display a Web page managed by the server device 20 for viewing by users.

Here, the client device 10 has test means according to the present invention and operates the test means to test behavior of Web pages.

At the time of test, the client device 10 accepts input of predetermined operation setting information from a tester or as appropriate accepts an input to a prompt to the tester and carries out a test.

Then, the client device 10 outputs a state transition diagram of a Web page or role estimation information for elements in Web page, which will be discussed later, as the result of the test, for example.

[Configuration of a Data Processing System]

The present invention can be realized as a computer, a data processing system, and a computer program. The computer program may be recorded on a computer-readable recording medium. A computer-readable recording medium may be any device that is capable of containing, storing, communicating, propagating or carrying a program for use in or relating to an instruction execution system, apparatus, or device.

The recording medium can be an electronic, magnetic, optical, electromagnetic, infrared or semiconductor system (or apparatus or device) or a propagation medium. Examples of computer-readable media include semiconductor or solid state storage devices, magnetic tapes, removable computer diskettes, RAM, ROM, rigid magnetic disks, or optical discs. Examples of optical disks at the present time include CD-ROM, CD-R/W, and DVD.

FIG. 2 is a block diagram showing the configuration of a computer (client device 10 and server device 20) according to a preferred embodiment of the invention.

A controller 11, a storage unit 12, an input unit 13, a display unit 14 and a communication controller 15 are interconnected via a bus 16.

The controller 11 is an information processing unit (CPU) that performs operation and processing of information, being responsible for control of the entire computer. The controller 11 as appropriate reads various programs stored in the storage unit 12 and executes the same to cooperate with the above mentioned hardware and realize various functions of the present invention.

The storage unit 12 may include local memory for use in execution of programs in combination with the controller 11, bulk storage of a large capacity, and cache memory that is used for efficient search in the bulk storage.

The input unit 13 accepts a user's input and includes a keyboard, pointing device and the like. The input unit 13 can connect to a computer directly or via an intervening I/O controller.

The display unit 14 displays a screen for accepting data input for the user or displays processing results by the computer, including display devices such as cathode ray tube (CRT) display devices and liquid crystal displays (LCD). The display unit 14 is capable of connecting to the computer directly or via an intervening I/O controller.

The communication controller 15 is a network adapter for enabling the computer to be connected to another operation processing system, a remote printer, or a storage device over a dedicated network or a public network. The communication controller 15 may include a modem, cable modem, and Ethernet® (a registered trademark) card.

[Overall Configuration of the Test Means]

FIG. 3 is a block diagram showing the implementation configuration of the test means that is provided in the client device 10 according to a preferred embodiment of the invention.

A browser 110 which includes a JAVA®SCRIPT engine 112 for realizing DHTML receives signals from a state management module 130, an HTTP request management module 150, an event generation module 170 and a DOM operation module 180, and changes the state of a displayed Web page.

A contents analysis module 120 receives DOM for a Web page, style information data, DOM Mutation events from the browser 110, or receives global variable data from the JAVA®SCRIPT state management module 130, and performs DOM analysis, JAVA®SCRIPT analysis, style analysis, and JAVA®SCRIPT state analysis (which will be described in more detail below). Here, a DOM Mutation event refers to an event that identifies a change such as addition, deletion or modification of a DOM component (for more information, see W3C, "Document Object Model Events" (online), Nov. 13, 2000 (searched on Oct. 18, 2005), the Internet URL: <http://www.w3.org/TR/DOM-Level-2-Events/events.html>).

The JAVA®SCRIPT state management module 130 obtains or modifies global variables that are used in JAVA®SCRIPT contained in a Web page. The JAVA®SCRIPT state management module 130 sends data resulting from acquisition of values of global variables to the contents analysis module 120.

The state determination module 140 stores data such as DOM, style information, the state of the input unit 13, such as a mouse or a keyboard, and values of global variables contained in JAVA®SCRIPT in the database 30 via the contents analysis module 120 (which will be described in more detail later).

The browser 110 generates an HTTP request when one navigates to a different page or a sub-window is generated in response to an event such as clinking on a link contained in a Web page. Upon receiving an HTTP request, the HTTP request management module 150 temporarily cancels the HTTP request and leaves the original page processed by the browser 110. The HTTP request management module 150 also saves the HTTP request in the database 30. This enables the HTTP request management module 150 to reproduce the HTTP request in response to an instruction signal from the state transition management module 160 or issue the HTTP request with some modification into the Web page.

The state transition management module 160 accepts input from a tester as required via the user input module 190, and, based on information obtained from the contents analysis module 120, virtually executes a state transition that can occur in a Web page by way of the JAVA®SCRIPT state management module 130, HTTP request management module 150, event generation module 170, and DOM operation module 180 (details of the process will be described below).

The event generation module 170 virtually executes an input event such as movement or clicking of a mouse on the browser 110 or operation of a keyboard in response to an instruction signal from the state transition management module 160 without receiving an input from the user.

The DOM operation module 180 performs operations such as addition or deletion of an element to DOM being processed on the browser 110 or modification of values in response to an instruction signal from the state transition management module 160.

The user input module 190 prompts a user to input settings such as the range of change for various values (e.g., date, random values, and input values to a form within a Web page) and the number of attempts in the test means, and accepts input from the tester (detail is described below).

[Flow of Contents Analysis]

FIG. 4 is a flow diagram showing the procedure of contents analysis carried out by the contents analysis module 120 of the test means according to a preferred embodiment of the invention.

At step S100, the contents analysis module 120 obtains DOM for a Web page from the browser 110 and analyzes the DOM to obtain form elements and events that are present in the Web page.

At step S105, the contents analysis module 120 gives an ID to each of the form elements and events obtained at step S100 and stores them in the database 30 (not shown).

At step S110, the contents analysis module 120 receives the value of a global variable from the JAVA®SCRIPT state management module 130.

At step S115, the contents analysis module 120 statically analyzes JAVA®SCRIPT elements that are present in the DOM obtained at step S100 and included JAVA®SCRIPT so as to identify conditional branches that are based on global variables, random values, or date. If there are conditional branches based on values in DOM, such as values in a form, the contents analysis module 120 identifies elements affected by the conditional branches.

At step S120, the contents analysis module 120 obtains data on style information, such as font sizes or a background color of the Web page, from the browser 110. Consequently, the contents analysis module 120 can obtain the coordinates of a mouse that is required when an event is issued in state transition management process, which will be described in more detail below, for example.

At step S125, the contents analysis module 120 identifies portions that have changed in DOM and style based on a DOM Mutation event or a calculation of difference in DOM and style information received from the browser 110.

At step S130, the contents analysis module 120 uses a technique for estimating the role of elements in HTML (e.g., Japanese Patent Laid-Open No. 2004-355528) for the portions with change to estimate a phenomenon that occurs in response to an event (e.g., pop-up of a pull-down menu and high-lighting of the screen), the role of elements affected by the event (such as menu, button, radio button, slide bar, etc) and/or the state of the elements (e.g., expanded, omitted, displayed, hidden, writing enabled, writing disabled, etc).

At step S135, the contents analysis module 120 monitors elements or the value of global variable in DOM that are affected by the conditional branches determined in JAVA®SCRIPT analysis at step S115, and identifies a branch condition for state transition, such as the value of a global variable for transitioning to a certain state. The value of the global variable has been obtained at step silo.

The order of the process steps is not limited to the one disclosed herein.

[Flow of State Determination]

FIG. 5 is a flow diagram showing the procedure of state determination that is performed by the state determination module 140 of the test means according to a preferred embodiment of the invention.

At step S200, the state determination module 140 receives data such as DOM, style information, the state of the input unit 13, and the value of the global variable from the contents analysis module, and determines a state as the combination of them.

At this point, input values to a form or character strings output by JAVA®SCRIPT may be abstracted as "numerical value", "character", or "time/date", and/or values of variables may be grouped into such as "integers equal to or less than 10", and/or the display area of the browser 110 may be segmented into some areas based on coordinate data for elements at which an event can occur and the same area may be put into the same state, and/or the state of areas that have a particular pattern may be put in the same state so as to reduce the number of states.

At step S205, the state determination module 140 compares the state determined at step S200 with a state previously stored in the database 30. If the states are the same, the processing proceeds to step S215, otherwise, to step S210.

At step S210, the state determination module 140 stores the state identified at step S200 to the database 30. To be specific, the state table 50 shown in FIG. 6 may be used, for example. In a state ID field, a state ID that identifies a state is newly given and stored. In a page field, the name of a Web page in which the state appears is stored. In a category field, an entry field, and a description field, categories and their description are stored, such as DOM, style including font and background color, state of JAVA®SCRIPT like global variables, and/or the state of the input unit 13 such as a mouse and a keyboard.

At step S215, the state determination module 140 stores data on transition to the identified state into the database 30. Specifically, the state determination module 140 uses the state transition table 60 in FIG. 7 to store an element ID for which an event occurred, an event ID, a state ID prior the occurrence of the event, and a state ID after the occurrence of the event.

The state determination module 140 also stores the result estimated by the contents analysis module at step S130 (FIG. 4) to the database 30. Specifically, it stores a phenomenon that occurs in response to the event to the state transition table 60 (FIG. 7), stores the role of an element that is affected by the event to the element role estimation table 70 (FIG. 8) along with the ID of the element, and stores the state of the element to the state table 50 (FIG. 6).

[Flow of State Transition Management]

FIG. 9 is a flow diagram showing the procedure of state transition management that is carried out by the state transition management module 160 of the test means and instruction signals from it according to a preferred embodiment of the invention.

At step S300, the state determination module 140 stores the initial state of a Web page to the database 30 (i.e., state determination described above). After storing the initial state as the reference state, the state transition management module 160 shifts processing to step S305.

At step S305, the contents analysis module 120 performs contents analysis, which was described above, in the reference state.

At step S310, the state transition management module 160 reads the event stored at step S105 (FIG. 4) and has the event occur via the event generation module 170. As a result, the state of the Web page changes.

At step S315, if the HTTP request management module 150 receives an HTTP request as a result of the event that occurred at step S310, it cancels the HTTP request temporarily and leaves the original page processed by the browser 110.

At step S320, the state determination module 140 stores the state after the change at step S310 to the database 30 (i.e., state determination described above).

At step S325, the state transition management module 160 determines whether or not all events in the reference state have been issued. More specifically, if all events that were obtained in contents analysis (step S305) in the reference state have been executed (step S310), it shifts processing to step S335; and if there is any event that has not been generated yet, it shifts processing to step S330.

At step S330, the state transition management module 160 returns state to the reference state (details will be described later) to prepare for occurrence of the next event.

At step S335, the state transition management module 160 determines whether or not contents analysis and state determination processes have been performed for all states in the Web page. To be specific, it performs contents analysis for all states that were stored at step S320, and when there is no unprocessed state any more, it shifts processing to step S345. If there is any unprocessed state, however, it shifts processing to step S340.

At step S340, the state transition management module 160 changes state to the next state (which will be described in detail below) to prepare for analysis of the next state.

At step S345, the state transition management module 160 formats the state, state transition, and estimated roles of elements in the Web page stored in the database 30 and displays them on the display unit 14. Examples of the display will be described below (FIGS. 14 and 15).

In the sequence of state transition management, after all events have been issued in a certain reference state, the state transition management module 160 changes the reference state to a state in which event issuance has not completed yet and stores the state, and repeats the same process until new state does not occur any more.

In event processing in JAVA®SCRIPT and the like, there may be conditional branches that are based on date/time, random values, or input values to a form. The state transition management module 160 identifies values to be changed by means of static analysis for JAVA®SCRIPT and/or debugging techniques in order to execute all the conditional branches and changes the values through execution of JAVA®SCRIPT for operation.

The range of a value to be changed may be inquired from a user through user input receiving process (which will be described in more detail later) or may be based on prescribed operation setting information. In addition, description of conditional branches may be overwritten for the purpose of recording and reproduction, and after all the branch destinations are executed, conditions for transitioning to each of the branch destinations may be stored or presented to the tester with the display unit 14 (e.g., a display and a printer) of the client device 10.

In a case random values or dates are used in JAVA®SCRIPT and infinite or a great number of states are generated, relevant event issuance may be finished at a certain number of issuances, or events may be issued based on the user's input or operation setting information through user's input acceptance process, to be discussed later.

[Flow of Return to Reference State]

FIG. 10 is a flow diagram showing the procedure of returning to the reference state in state transition management process (FIG. 9) of the test means according to a preferred embodiment of the invention.

At step S400, the state transition management module 160 reads from the database 30 the reference state that has been stored at step S300 (FIG. 9) or that has been reset at step S340 (FIG. 9).

At step S405, the state transition management module 160 changes DOM for the Web page on the browser 110 to DOM that is extracted from the reference state read at step S400 via the DOM operation module 180.

At step S410, the state transition management module 160 changes the state of JAVA®SCRIPT on the browser 110 to the state of JAVA®SCRIPT extracted from the reference state that bas been read at step S400 via the state management module 130.

The order of processes at steps S405 and S410 are not limited to the one disclosed herein.

[Flow of Change to the Next State]

FIG. 11 is a flow diagram showing the procedure of changing to the next state in state transition management process (FIG. 9) of the test means according to a preferred embodiment of the invention.

At step S500, the state transition management module 160 reads a state that has been stored at step S320 (FIG. 9) and for which an event has not been issued from the database 30.

At step S505, the state transition management module 160 changes DOM for the Web page on the browser 110 to DOM that is extracted from the state that has been read in at step S500, via the DOM operation module 180.

At step S510, the state transition management module 160 changes the state of JAVA®SCRIPT on the browser 110 to the state of JAVA®SCRIPT that is extracted from the state that has been read at step S500 via the state management module 130.

At step S515, the state transition management module 160 resets and stores the state read at step S500 as the reference state.

[Flow of Accepting a User's Input]

FIG. 12 is a flow diagram showing the procedure of accepting a user's input in state transition management process (FIG. 9) of the test means according to a preferred embodiment of the invention.

At step S600, the user's input module 190 presents display for accepting the user's input on the display unit 14 of the client device 10 (not shown).

At step S605, the user input module 190 accepts input by the user from the input unit 13 (e.g., a keyboard or mouse) of the client device 10.

The user input acceptance may be a process of making an inquiry to a user as required and waiting for the user's reply as mentioned above, or accepting input in advance, or reading operation setting information data that is stored in the system as prescribed data and executing it automatically.

[Configuration of a Test Environment Including the Server Device]

FIG. 13 is a block diagram showing the implementation configuration for a case where the test environment according to a preferred embodiment is expanded to the server device 20.

An environment in which modules for supporting debugging are implemented by setting break points in JAVA®SCRIPT or enabling step execution on a Web server is called an integrated development environment (see Parkin, S. "Rapid Java® and J2EE Development with IBM WebSphere Studio and IBM Rational Developer" (online), October, 2004, IBM Rational white paper (searched on Oct. 18, 2005), Internet URL <http://www3.software.ibm.com/ibmdl/pub/software/rational/web/whitepapers/wp-radrwd-med-res.pdf>).

In an integrated development environment 210, a debugging module 214 obtains or modifies values of variables on a Web server 212.

Here, a server side state transition management module 220 monitors values of variables on the Web server 212 via the debugging module 214, includes the values as the state of a Web page, and stores them to the state table 50 of the database 30, for example.

Consequently, the test procedure can store not only a single Web page but state transition throughout a Web application that is managed on the Web server 212.

The database 30 may be inside the client device 10, inside the server device 20, or external to the client device 10 and the server device 20.

[Example of Transition Information Presentation]

FIGS. 14 to 16 show examples of presentation to a user with respect to presentation of state transition information in state transition management process (step S345) of the test means according to a preferred embodiment of the invention.

The state transition management module 160 indicates states in a single Web page or a number of Web pages as well as information on transition among those states.

In the example of FIG. 14, the state transition management module 160 indicates the result of Web page display in states 1 to 4 and events that cause transition among the states. For example, in state 1 (initial state), when a mouse moves onto "products" in a menu, a sub-menu 1 appears (state 2). Subsequently, when the mouse moves onto "PC" in the sub-menu, sub-sub-menu 1 appears (state 3).

In the example shown in FIG. 15, for state transition from state 1 to state 2, results of Web page display are associated with data such as style, the state of JAVA®SCRIPT and DOM at the time, and changes caused by event issuance are indicated. For example, in the screen example in state 2, the element that caused issuance of an event (i.e., "products") and an element that has been changed due to the event (i.e., a pull-down menu for products) are highlighted. Display of a phenomenon that is caused by the event (i.e., pop-up of the pull-down menu) on the screen helps understanding by the tester. In addition, any portion of style, the state of JAVA®SCRIPT and DOM that has changed is highlighted.

Although tree view is used to represent DOM in the example of FIG. 15, text format such as shown in FIG. 16 may also be used. In the example shown in FIG. 16, understanding by the tester is facilitated through highlighting of a portion of HTML that has changed due to state transition (i.e., from "hidden" to "visible").

Alternatively, various display formats may be provided as required by the tester, e.g., only portions with change may be displayed instead of displaying the entire screen, and/or a certain operation series are reproduced frame-by-frame like animation.

Narrowing based on conditions is also possible, e.g., listing of behaviors that is made when a certain event is issued, listing of events relevant to elements that have particular roles, or listing of state transitions in a particular state of JAVA®SCRIPT.

According to the above described embodiment, it is possible to check accessibility of a Web page that utilizes DHTML or requirement definition, which have been conventionally difficult.

For example, with an existing accessibility checker, it is difficult to check states other than the initial state in a page utilizing DHTML. By using the present invention, it is possible to automatically collect and reproduce states that can occur in a Web page utilizing DHTML, that is, information such as DOM and style, so that a tester can carry out accessibility check for each of the states.

The tester can use state transition information obtained with the invention to determine whether there is transition depending on a particular input unit 13 (e.g., behavior differs between operation with a mouse and operation with a keyboard).

In order to link a Web page to AT software such as a screen reader mentioned above, it is required that a correct role is given to each element that utilizes DHTML. By utilizing the present invention in combination with a technique for estimating roles of elements in HTML, the tester can compare phenomena that are caused by events and/or estimation result of role and state of elements that are affected by events with actually given roles to find any error by the creator of the Web page. The tester can also carry out tasks efficiently by presenting estimated results as candidates when correcting errors or giving information to existing contents for which role and state are not given to elements.

Since operation of DHTML varies with implementation of browsers, a Web page often determines the type of a browser and changes its operation. The tester can compare pieces of state transition information obtained using the present invention to easily grasp difference in operation among various browsers.

While the embodiment of the present invention has been described, the present invention is not limited to the above described embodiment. The advantage described in the preferred embodiment of the invention merely mentions most preferable advantage provided by the invention and the advantage of the invention is not limited to the ones set forth in the embodiment of the invention.

What is claimed is:

1. A computer-implemented method for analyzing a state transition in a web page that utilizes dynamic hyper text markup language, comprising the steps of:

acquiring an event that operates the dynamic hyper text markup language and dynamically causes a state transition within the web page, by analyzing a document object model of the web page;

virtually executing the state transition within the web page after input from a user;

virtually executing the event in order to acquire a state after the state transition without receiving any input from a user;

identifying each of the web page states after the transition by virtually executing a plurality of different events different to the same web page as data that is composed of at least one of the document object model, style information rendered on a browser, data indicating an input status from a virtually-executed user input device, and a value of a global variable, and storing an identified state without redundancy;

dynamically receiving from a user information including test date, random test values, and a number of test attempts;

reducing a number of states of the web page by grouping variable values;

acquiring and storing an estimated role of each element affected by the event that operates the dynamic hyper text markup language in a role estimation table;

estimating a display change of the web page that occurs due to the acquired event and a type and a state of each element affected by the acquired event, by analyzing a changed part of the data that specifies the state of each element affected by the acquired event within the web page and a structure of the web page;

reading out a stored state and changing the web page to the readout state; and displaying the readout state on a computer display.

2. The method according to claim 1, comprising the steps of:

collecting and storing hypertext transfer protocol requests that can occur by executing the events; and reading out a stored hypertext transfer protocol requests and reproducing the requests.

3. The method according to claim 1, comprising the step of:

displaying information indicating a portion that has been changed due to the transition of the web page state.

4. The method according to claim 1, comprising the step of:

acquiring the state within the web page by a plurality of browsers, and detecting a difference among the browsers.

* * * * *